(12) United States Patent
Sojka et al.

(10) Patent No.: US 6,193,161 B1
(45) Date of Patent: Feb. 27, 2001

(54) BAR CODE READER HAVING INDEPENDENT BAR CODE READ ACTIVATION DATA CAPABILITIES

(75) Inventors: Marvin L. Sojka, Magnolia; Timothy P. O'Hagan, The Woodlands, both of TX (US)

(73) Assignee: Telxon Corporation, The Woodlands, TX (US)

( * ) Notice: Subject to any disclaimer, the term of this patent is extended or adjusted under 35 U.S.C. 154(b) by 0 days.

(21) Appl. No.: 09/178,398

(22) Filed: Oct. 23, 1998

(51) Int. Cl.[7] .................................................. G06K 7/10
(52) U.S. Cl. ............................ 235/472.01; 235/462.46
(58) Field of Search ........................... 235/462.46, 472.01

(56) References Cited

U.S. PATENT DOCUMENTS

| | | | |
|---|---|---|---|
| 5,065,003 | * | 11/1991 | Wakatsuki et al. ............. 235/462.46 |
| 5,107,100 | * | 4/1992 | Shephard et al. ............... 235/462.46 |
| 5,130,520 | | 7/1992 | Shepherd et al. . |
| 5,216,233 | * | 6/1993 | Main et al. ............................ 235/383 |
| 5,280,159 | * | 1/1994 | Schultz ............................ 235/462.76 |
| 5,322,991 | * | 6/1994 | Hanson ............................ 235/462.46 |

* cited by examiner

Primary Examiner—Harold I. Pitts
(74) Attorney, Agent, or Firm—Renner, Otto, Boisselle & Sklar, LLP

(57) ABSTRACT

A bar code reader includes a housing and a reader module disposed in the housing for reading bar code indicia and producing an analog signal representative of the bar code indicia. A decoder is coupled to the reader module for receiving the analog signal and decoding the analog signal into decoded data representative of the bar code indicia. A central processor is coupled to the decoder and serves to receive and process the decoded data representative of the bar code indicia. The reader module and the decoder operate independently of the processor.

25 Claims, 2 Drawing Sheets

BAR CODE READER HAVING INDEPENDENT BAR CODE READ ACTIVATION DATA CAPABILITIES

TECHNICAL FIELD

The present invention relates generally to a portable bar code reader, and more particularly to a portable bar code reader having independent bar code read activation and data decoding capabilities.

BACKGROUND OF THE INVENTION

In recent years, the use of bar code readers for data storage and retrieval have become increasingly popular. For instance, bar code readers are widely used in the retail industry to expedite price entry and verification at check-out counters, in warehouses for taking inventory, by delivery personnel to assist in tracking packages, in hospitals to aid in electronically maintaining patient data, and in a variety of other industries.

Often times a bar code reader may be portable and wireless in nature thereby providing added flexibility. In these circumstances, such portable bar code readers form part of a wireless network in which data collected within the terminals is communicated to a host computer situated on a hardwired backbone via a wireless link. For example, the portable bar code readers may include a radio or optical transceiver for communicating with a host computer via a base station.

Conventionally, a bar code reader, whether portable or otherwise, includes a central processor which directly controls the operations of the various electrical components housed within the bar code reader. For example, the central processor controls detection of keyboard entries, display features, wireless communication functions, trigger detection, and bar code read and decode functionality. Unfortunately, activity from the many components of a bar code reader can cause a significant load on the central processor which slows its overall operational efficiency. An example of a conventional bar code scanner having a central processor which controls the overall operations of the internal electrical components can be found in U.S. Pat. No. 5,130,520 assigned to Symbol Technologies, Inc.

Additionally, in a conventional bar code reader, once a trigger activation is detected the central processor provides a signal to an optical reader to read the bar code indicia. Once the bar code data is read, a square wave analog signal representative of the bar code data is produced. In order to convert the square wave analog signal into a format suitable for digital processing and decoding by the central processor, an ASIC or other custom digitizer chip is used. Use of such a custom digitizer chip typically necessitates designing a large amount of custom hardware and software which adds significantly to the time and cost of producing the bar code reader and makes compatibility and interchangeability of parts among different bar code readers difficult.

Accordingly, there is a strong need in the art for a bar code reader having a terminal architecture which overcomes the above mentioned problems and others.

SUMMARY OF THE INVENTION

The present invention provides a bar code reader having a unique terminal architecture in which activation of a read operation and decoding and converting of a bar code indica read occurs independently of a central processor. By independently activating an optical bar-code reading element and independently decoding and converting data read by the optical bar-code reading element, the central processor is subjected to a reduced load and therefore operates at faster, more efficient speeds. Further, by providing decoding functionality independent of the processor, a stand-alone, universal decoding chip can be utilized within different bar code reading devices.

Accordingly, use of such a stand-alone decoding chip adds to the interoperability of bar code reader component and significantly reduces the amount of time spent in custom designing and coding a decode chip for each different bar code reading device. Thus, the present invention provides a more efficient and robust terminal architecture for both wired and wireless bar code reading devices.

Thus, according to one aspect of the present invention, a bar code reader is provided. The bar code reader includes a housing, a reader module disposed in the housing for reading bar code indicia and producing an analog signal representative of the bar code indicia, a decoder coupled to the reader module for receiving the analog signal and decoding the analog signal into decoded data representative of the bar code indicia, and a central processor coupled to the decoder, the processor receiving and processing the decoded data, wherein the reader module operates independently of the processor.

In accordance with another aspect of the present invention, a portable handheld bar code reader is provided. The bar code reader includes a housing, a radio transceiver disposed in the housing for transmitting and receiving wireless signals with a remote location, a keypad means disposed on the housing for entry of data, a display means disposed on the housing for display of data, a reading means disposed in the housing for reading bar code indicia and producing an analog signal representative of the bar code indicia, a decoding means disposed in the housing for receiving the analog signal and decoding the analog signal into decoded data representative of the bar code indicia, an activation means disposed on the housing and coupled to the reading means through the decoding means, the activation means serving as a trigger for activating the decoding means, a central processing means for controlling operations of the keypad means, display means and the radio transceiver, and receiving the decoded data representative of the bar code indicia, and power supply means for powering the bar code reader, wherein the activation means activates decoding means independent of the processing means.

In accordance with yet another aspect of the present invention, a method of reading bar code indicia is provided. The method includes the steps of initiating a bar code read operation, activating a reader module in response to initiation of the bar code read operation, reading bar code indicia by the reader module and producing an analog signal indicative of the bar code indicia, decoding the analog signal to provide decoded data indicative of the bar code indicia, and supplying a central processor with the decoded data indicative of the bar code indicia, wherein the steps of initiating the bar code read operation and activating the reader module occur independent of the processor.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts.

Figure 1:
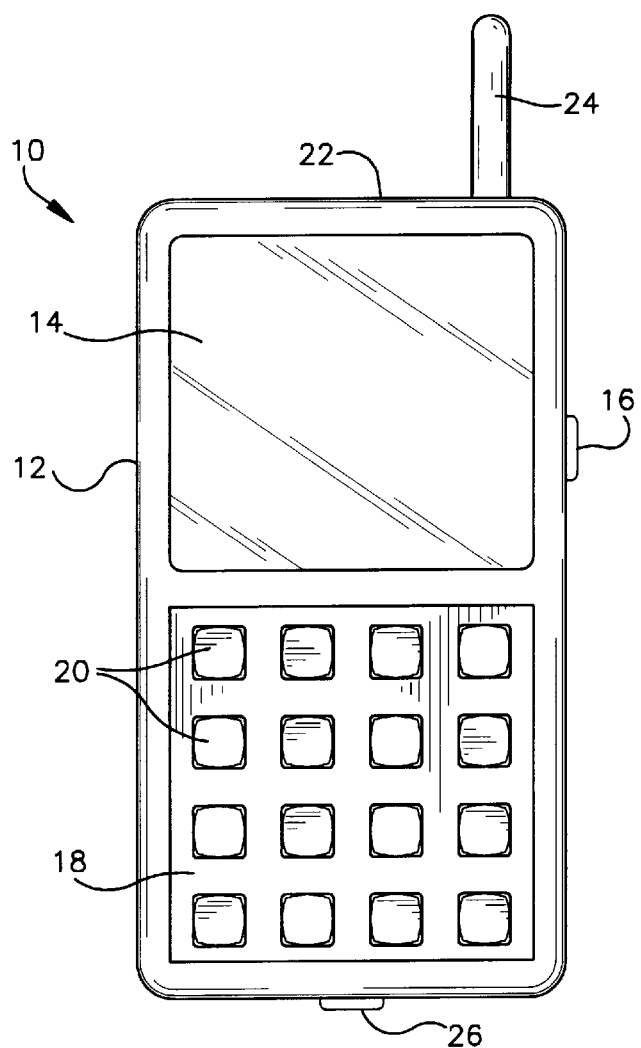
FIG. 1 is a front view of a bar code reader in accordance with the present invention.

Referring initially to FIG. 1, shown is an exemplary bar code reading terminal (terminal) 10 in accordance with the present invention. The terminal 10 includes a main housing 12 made of molded plastic or the like. The main housing 12 preferably is sized to fit conveniently in the hand of an operator.

Included within the main housing 12 is a display 14. The display 14 may be a conventional liquid crystal display (LCD) such as an active matrix LCD or the like. Alternatively, the display 14 may be an electroluminescent type display, etc.

The terminal 10 further includes a keypad 18 having a plurality of different keys 20. Each key 20 may be depressed by an operator in order to enter information and/or cause the terminal 10 to perform a desired function.

The terminal 10 also includes a modular optical bar code reading element 22 (reader module 22) which allows the operator to input information from bar code labels. The reader module 22 may, for example, include a laser scanning module such as that available from Symbol Technologies Inc. of Holtsville, N.Y. or PSC, Inc. of Webster, N.Y. Alternatively, the reader module may include a CCD reader such as that available from Metanetics Corp. of Bothel, Wash. A bar code activation trigger switch 16 is disposed on a side of the terminal 10 to initiate reading of a bar code label as is discussed more fully below. The trigger switch 16 may be in the form of a depressable button, a gun-like trigger, and/or an entry from a touch-screen, for example. Alternatively, activation of the reading module may occur automatically without activating a trigger switch 16 using one of the conventionally known auto-triggering techniques.

Furthermore, the terminal 10 includes a modular radio transceiver 60 coupled to an antenna 24 which allows the terminal 10 to communicate wirelessly with a base station in a wireless network. It will be appreciated, however, that the present invention is not limited to portable and/or wireless terminals 10, but rather, the present invention is suitable for use with terminals which are fixed in place, electrically tethered to a computer or cash register, etc.

In addition, the terminal 10 includes a communication port 26 exposed through a wall of the main housing 12. The communication port 26 permits the terminal 10 to communicate information and/or download software via a hardwired connection. The communication port 26 may be any type of standard connector or cradle contacts that allows electronic circuitry within the terminal 10 to communicate with another device. In the present embodiment the communication port 26 functions as a 16550 UART serial communication port.

Figure 2:
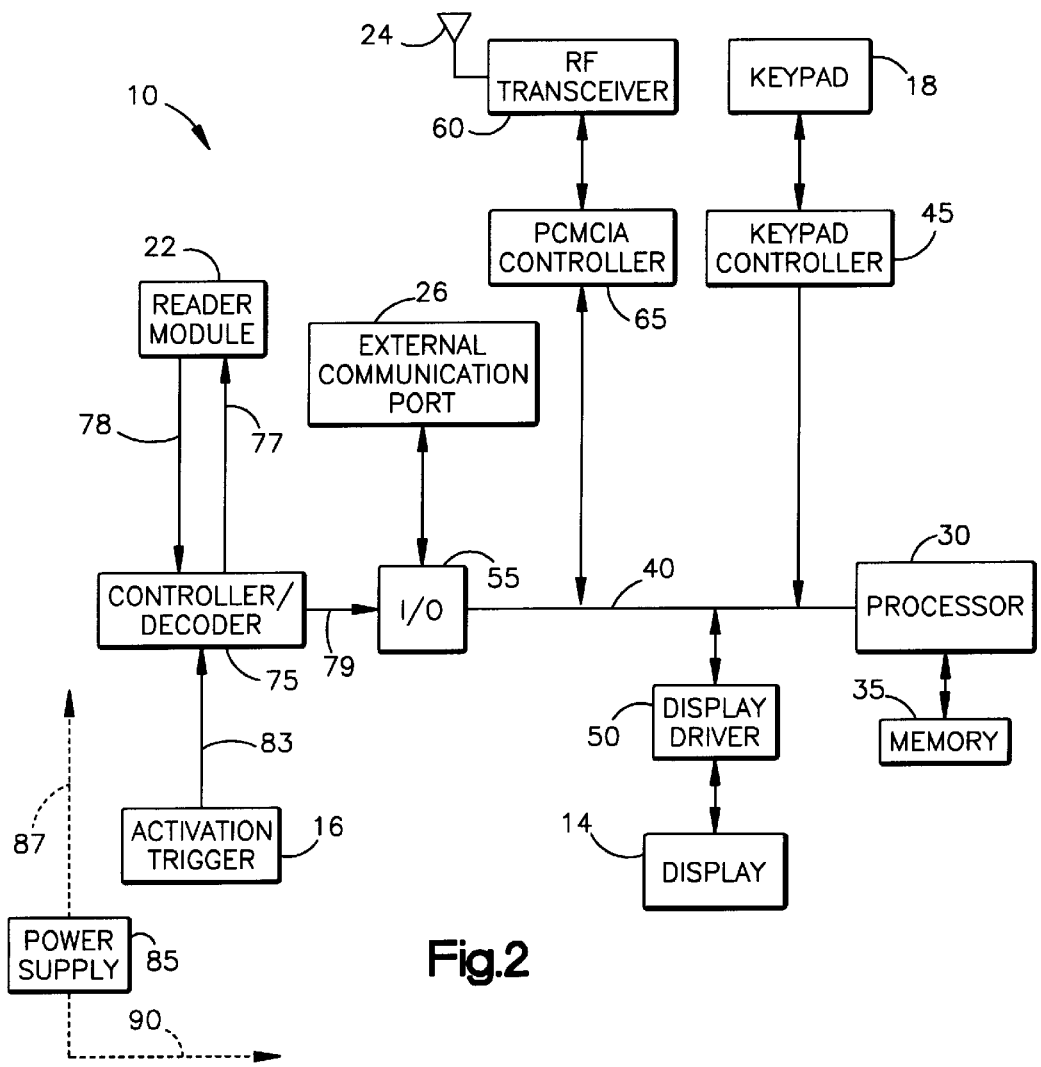
FIG. 2 is a block diagram representing the electronic circuitry included in the bar code reader in accordance with the present invention.

Referring now to FIG. 2, the electronic circuitry included within the housing 12 of the terminal 10 is depicted. As is described in more detail below, the present invention provides a unique terminal architecture which eliminates reliance on a central processor 30 for controlling all functions of the terminal 10 and further enhances modular interchangeability of components among different bar code reading devices.

The central processor 30 is coupled to a memory 35 which serves as a storage and retrieval medium for the processor 30. For example, the memory 35 may include both read-only-memory (ROM) and random-access-memory (RAM). The memory 35 stores instructions for performing the various operations of the terminal 10 that are controlled by the processor 30.

The processor 30 may take any one of a variety of known forms, including those processors produced by Intel, Apple, Advanced Micro Devices (AMD), etc. In the present invention, the processor 30 is preferably an integrated processor such a the SC400 available from AMD, of Austin, Tex.

The processor 30 includes a bus 40 which preferably conforms to ISA standards for data communication with multiple peripheral components of the terminal 10 which also comply with the ISA standards. Alternatively, a bus conforming to PCI standards or other bus configuration could be used. Coupled to the processor 30 through the bus 40 are both a keypad controller 45 and a display driver 50. The keypad 18 is coupled to the keypad controller 45. The keypad controller 45 functions in a conventionally know manner to continually scan the rows and columns of the keypad 18 in search of a depressed key 20. After detecting a key depression and identifying the key 20, the keypad controller 45 generates an interrupt to the processor 30 in a conventional manner.

The display 14 is coupled to the bus 40 via the display driver 50. The processor 30 runs an application program for processing data transactions which control the contents of the display 14. In particular, the content of the display 14 is controlled by the processor 30 by way of the processor 30 appropriately controlling the display driver 50 as is conventional.

A radio transceiver 60 is also coupled to the bus 40 via a PCMCIA controller 65. The radio transceiver permits the terminal 10 to communicate wirelessly with other devices, such as a base station, using conventional techniques. In the event the terminal 10 is to transmit information to another device, the processor 30 provides such information to the transceiver 60 via the bus 40 and controller 65. The transceiver 60 in turn transmits the information as part of an RF signal to the other device using the antenna 24. On the other hand, information which is transmitted to the terminal 10 from another device is received by the transceiver 60 via the antenna 24. The transceiver 60 in turn provides the information to the processor 30 via the controller 65 and bus 40.

Also coupled to the processor 30 via the bus 40 is input/output (I/O) logic array 55. The I/O logic array 55 provides logic and connections for interfacing various conventional I/O devices. The external communication port 26 provided on the outside of the housing 12 (FIG. 1) is directly connected to the I/O logic array 55 thereby allowing signals to be communicated between any device coupled to the communication port 26 and the processor 30.

A bar code controller/decoder 75 (hereinafter referred to as decoder 75) is coupled to the reader module 22 via lines 77 and 78. Line 77 is used to inform the reader module 22 when the trigger switch 16 has been depressed and a read operation should be commenced. Line 78 is used by the decoder 75 to receive an analog square wave signal from the reader module 22 indicative of data read by the reader module 22. The decoder 75 serves to convert and decode the analog square wave signals received from the reader module 22 into decoded digital data suitable for processing by the processor 30. Decoding of the analog square wave signals may, for example, include the step of converting the analog square wave signals into a conventional "X" or "T" sequence whereby a signal representative of the width of each portion of a square wave signal is represented by a series of integer numbers.

The decoder 75 further, provides a serial communication path between the reader module 22 and the processor 30 via line 79. In particular, the serial communication link established by the decoder 75 allows the reader module 22 to communicate information to the processor 30 via I/0 logic array 55 and bus 40. In the present embodiment, the decoder 75 is a commercially available by ID technologies of Brea, California. By providing a standalone decoder 75 which interfaces directly with reader module 22, the present invention provides advantages in that the processor 30 is not required to spend significant time decoding data read by the reader module 22 as is done in conventional terminals 10. Also no custom ASIC or associated custom software is needed to convert the analog square wave signal into an appropriate digital integer sequence for processor decoding. Accordingly, as custom interfacing conventionally need to interface the reader module 22 to the processor 30 is not necessary according to the terminal architecture of the present invention, a higher degree of interchangeability of components using industry standard interfaces is available.

The trigger switch 16 is coupled to the decoder 75 via line 83. As is discussed in more detail below, activation of the reader module 22 is controlled by the trigger switch 16 via the decoder 75. Thus, unlike conventional bar code reading devices, operation of the reader module 22 is independent of the processor 30. Accordingly, the overall load on the processor 30 is reduced thereby allowing the processor 30 to more efficiently run other operations. It should also be noted that operation of the other peripherals (i.e. keypad 18, display 14 and radio transceiver 60) are independent of the decoder 75.

Power is supplied to all of the components of the terminal 10 via power supply circuitry 85. In supplying power, the power supply circuitry provides a dedicated lead 87 for providing power to the reader module 22, decoder 75 and trigger switch 16 while power to all other components of the terminal 10 is distributed via a general power supply lead 90. Of course, other manners of distributing power from the power supply circuitry 85 could be used.

Figure 3:
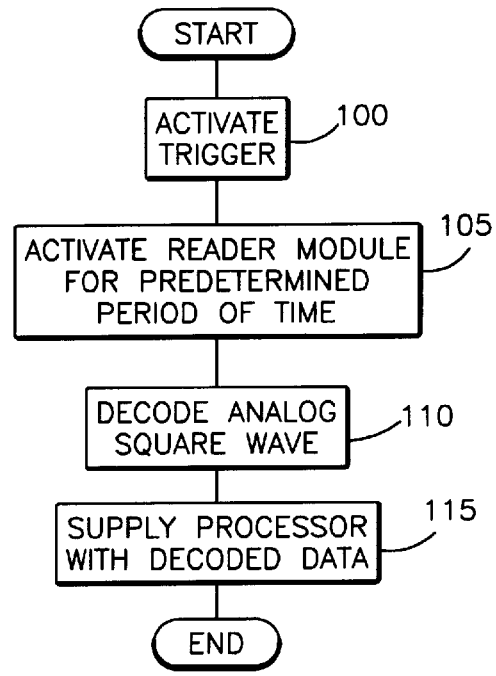
FIG. 3 is a block diagram depicting the steps performed by the bar code reader following activation of a bar code read operation in accordance with the present invention.

Referring now to FIGS. 2 and 3, the operations of the present invention with respect to preforming a bar code read operation is discussed. At step 100, the user depresses the trigger switch 16 thereby initiating a bar code read operation. Upon depression of the trigger switch 16, a signal is sent from the trigger switch 16 to the decoder 75 via line 83. Upon receiving the signal from line 83, the decoder 75 immediately provides a signal to the reader module 22 via line 77 indicating that a bar code read operation is to be performed. Unlike conventional bar code reading devices, the processor 30 is not involved with sensing the depression of the trigger switch 16 and/or initiating a read operation by the reader module 22. In fact, if the processor 30 is in a power saving suspend mode, it may remain in such a mode throughout the reading operation.

In step 105, the reader module 22 receives the activation signal via line 77, and activates the reader module components for a predetermined period of time thereby enabling the reading of, for example, bar code indicia. In the present invention the predetermined period of time is set at two seconds, however, it will be appreciated that other suitable read module activation times could alternatively be used. Thus, in the present embodiment, the duration of activation of the reader module 22 is independent of the amount of time the user maintains depression of the trigger switch 16 and is independent of whether there is a successful decode or not. In this manner, if the user only quickly depresses and releases the trigger switch 16, the reader module 22 nevertheless remains on for the predetermined period of time. Alternatively, if the user depresses and holds the trigger switch 16 for an extended time, the reader module 22 may nevertheless automatically turn the reader module 22 off after the predetermined period of time so as to conserve power. Re-activation of the reader module 22 is, of course, possible by simply releasing and depressing the trigger switch 16 again.

In step 110, following activation of the reader module 22, data read by the reader module 22 is supplied to the decoder 75 via line 78 in the form of an analog square wave signal. The decoder 75 then preforms appropriate processing of the analog square Wave signal to convert such signal into an "X" or "T" sequence as is known in the art. The decoder 75 also decodes the sequence into decoded characters which are suitable for processing by the processor 30. In the present embodiment, the decoder decodes the sequence into ASCI or unicode data characters. As the decoder 75 performs decoding operations independent of the processor 30, a significant amount of processing time and power is conserved.

Finally, in step 115 the data decoded by the decoder 75 is provided to the processor 30 for further processing and storage. A standard ring indicate signal may be used to resume the processor 30 from a low power suspend state in the event the processor 30 was in such a state. The ring indicate signal may be provided in any conventional manner and thus further discussion is omitted for sake of brevity. The decoded data is transmitted by the decoder 75 to the I/O logic array 55 via serial line 79. The I/O logic array 55, in turn, generates an interrupt and forwards this information to the processor 30 via bus 40.

Thus, according to the present invention, not only is trigger activation and initiation of a read operation 22 preformed independent of the processor 30, but also decoding functions of data read by the reader module 22 is also accomplished independent of the processor 30. Thus, a significant amount of load is removed from the processor 30 thereby enabling it to perform its other functions more efficiently. Further, utilization of the decoder 75 allows for better inter-operability of components among different bar code reading devices.

The invention has been described with reference to the preferred embodiments. Obviously, modifications and alterations will occur to others upon reading and understanding the preceding detailed description. For example, rather than connecting the radio transceiver 60 to the bus 40 via a PCMCIA controller, the radio transceiver 60 could be serially connected to the I/O logic array 55. Alternatively, the PCMCIA controller could be built into the radio transceiver 60 and be directly coupled to the processor 30 via a PCMCIA bus. It is intended that the invention be construed as including all such modifications alterations, and equivalents thereof and is limited only by the scope of the following claims.

What is claimed is:

1. A bar code reader, comprising:
   a housing;
   a reader module disposed in the housing for reading bar code indicia and producing an analog signal representative of the bar code indicia;
   a decoder coupled to the reader module for receiving the analog signal and decoding the analog signal into decoded data representative of the bar code indicia; and
   a central processor coupled to the decoder, the processor receiving and processing the decoded data and directly controlling operation of non-decoder and non-reader components within the housing;
   wherein the reader module operates independently of the processor.

2. The bar code reader of claim 1, further comprising:
   a radio transceiver coupled to the processor for transmitting and receiving wireless communication with a remote device.

3. The bar code reader of claim 1, further comprising a trigger for activating the reader module, wherein the trigger is electrically coupled to the decoder.

4. The bar code reader of claim 1, further comprising a power supply disposed in the housing for supplying power to the bar code reader.

5. The bar code reader of claim 4, wherein the power supply includes a dedicated power supply line for providing power to the reader module and the decoder.

6. The bar code reader of claim 1, further comprising:
   a keypad disposed on the housing for entry of data, the keypad electrically coupled to the processor; and
   a display screen disposed on the housing for displaying data, the display screen electrically coupled to the processor.

7. The bar code reader of claim 1, wherein the decoded data is ASCI data.

8. The bar code reader of claim 1, wherein the decoder operates independently of the processor.

9. The bar code reader of claim 1, wherein the analog signal representative of the bar code indicia produced by the reader module is an square wave analog signal.

10. A portable handheld bar code reader, comprising:
    a housing;
    a radio transceiver disposed in the housing for transmitting and receiving wireless signals with a remote location;
    keypad means disposed on the housing for entry of data;
    display means disposed on the housing for display of data;
    reading means disposed in the housing for reading bar code indicia and producing an analog signal representative of the bar code indicia;
    decoding means disposed in the housing for receiving the analog signal and decoding the analog signal into decoded data representative of the bar code indicia;
    activation means disposed on the housing and coupled to the reading means through the decoding means, the activation means serving as a trigger for activating the decoding means;
    central processing means for controlling operations of the keypad means, display means and the radio transceiver, and receiving the decoded data representative of the bar code indicia; and
    power supply means for powering the bar code reader;
    wherein the activation means activates decoding means independent of the processing means.

11. The bar code reader of claim 10, wherein the power supply means includes a dedicated power supply line for providing power to the reading means and the decoding means.

12. The bar code reader of claim 10, wherein the analog signal representative of the bar code indicia produced by the reader module is an square wave analog signal.

13. The bar code reader of claim 12, wherein the decoding means decodes and converts the square wave analog signal independent of the processing means.

14. The bar code reader of claim 10, wherein the decoded data is ASCI data.

15. A method of reading bar code indicia, comprising the steps of:
    initiating a bar code read operation;
    activating a reader module in response to initiation of the bar code read operation;
    reading bar code indicia by the reader module and producing an analog signal indicative of the bar code indicia;
    decoding the analog signal to produce decoded data representative of the bar code indicia; and
    supplying a central processor with the decoded data representative of the bar code indicia;
    wherein the steps of initiating the bar code read operation and activating the reader module occur independent of the processor.

16. The method of claim 15, wherein the step of decoding occurs independent of the processor.

17. The method of claim 15, wherein step of initiating a bar code read operation is by way of depressing a trigger.

18. The method of claim 15, wherein the decoded data is ASCI data.

19. The method of claim 15, wherein the decoded data is unicode data.

20. The method of claim 15, wherein the reader module remains active for a predetermined period of time following activation of the reader module.

21. The method of claim 15, further comprising the step of wirelessly transmitting the decoded data representative of the bar code indicia to a remote location.

22. The bar code reader of claim 1, wherein the central processor controls detection of keyboard entries, display features, and wireless communication functions.

23. The bar code reader of claim 1, wherein the central processor controls detection of keyboard entries.

24. The bar code reader of claim 1, wherein the central processor controls display features.

25. The bar code reader of claim 1, wherein the central processor controls wireless communication functions.

* * * * *